Feb. 20, 1962 C. C. RAYBURN 3,022,369

WIRE CONNECTOR FOR PRINTED CIRCUIT BOARD OR THE LIKE

Original Filed Feb. 2, 1956 2 Sheets-Sheet 1

INVENTOR
Charles C. Rayburn
BY Robert W. Beart
ATTORNEY

Feb. 20, 1962 C. C. RAYBURN 3,022,369

WIRE CONNECTOR FOR PRINTED CIRCUIT BOARD OR THE LIKE

Original Filed Feb. 2, 1956 2 Sheets-Sheet 2

INVENTOR.
Charles C. Rayburn
BY
Robert W. Beart
ATTORNEY

United States Patent Office 3,022,369

Patented Feb. 20, 1962

3,022,369

WIRE CONNECTOR FOR PRINTED CIRCUIT BOARD OR THE LIKE

Charles C. Rayburn, Falls Church, Va., assignor, by mesne assignments, to Illinois Tool Works, Chicago, Ill., a corporation of Illinois Original application Feb. 2, 1956, Ser. No. 563,091, now Patent No. 2,948,953, dated Aug. 16, 1960. Divided and this application June 16, 1960, Ser. No. 36,507
5 Claims. (Cl. 174—68.5)

This invention relates generally to circuit boards or panels of the printed laminar type, and more particularly to a novel article for making a connection between conductive paths on the panel or between opposing surfaces of the panel, and is a divisional application of U.S. Patent 2,948,953.

Modern electronic fabrication techniques make extensive use of circuit panels of the type known as printed circuits. The present invention provides an improvement in the making of connections to or interconnecting between the conductive paths of such circuit panels. In the printed circuit art an array of conductors is formed on one side of an insulating sheet and when interconnections between selected conductors are to be made it is usual practice to utilize the opposite surface of the panel for the crossover conductor. The ordinary way is to form passages piercing the insulating sheet and conductive paths and deposit a coating of metal on the inside of the passages so formed, or sometimes a rivet or the like is used to form a conductive area through the body of the panel and a wire is extended between the ends of the terminals. These methods are complicated and reasonably expensive as will be readily appreciated, but the article for interconnection hereinafter disclosed solves the problem of panel surface path connection in a manner particularly suited to automatic machinery.

Summarily stated, the invention consists of a novel article for forming a terminal on an insulating panel carrying an array of conductive paths and having passages therethrough piercing selected paths, which comprises the use of a flexible wire initially parallel to the plane of the panel and bridging a passage, the wire being grasped by suitable means at the bridging portion to simultaneously apply torque and thrust to the bridging portion to thereby twist the wire into a series of convolutions and form a helix, whereby the threading of said helix through the passage in edge-engaging relationship to extend beyond the path is accomplished and a novel article is formed. As will be apparent, such an article is useful in interconnecting between conductive paths carried on an insulating panel and is well adapted to interconnect such path if only one side of the panel is available as a working surface, all operations being carried out from the usable side. This situation frequently exists in fabrication of small parts for the aircraft industry where limited volumes must hold mounted components and the spacing does not allow access to a panel from both sides.

It is therefore an object of this invention to improve on the printed circuit panels now in use.

It is another object of this invention to provide a panel supporting printed circuitry on one side thereof and a conductive strand on the other side, such strand intercommunicating between the conductive paths of the circuitry.

It is a yet further object of this invention to provide a printed circuit having a passage therethrough and a terminal in the form of a helix extending through said passage to engage the circuit.

Other features and advantages of the invention will appear from the detailed description when taken with the drawings in which.

Figure 5:
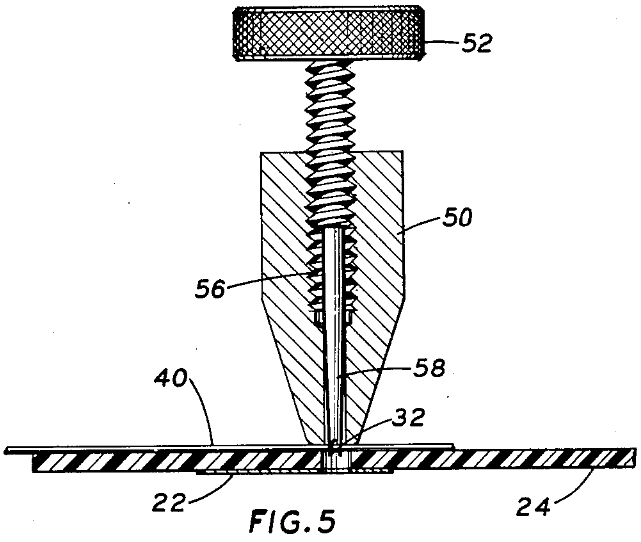
Figure 6:
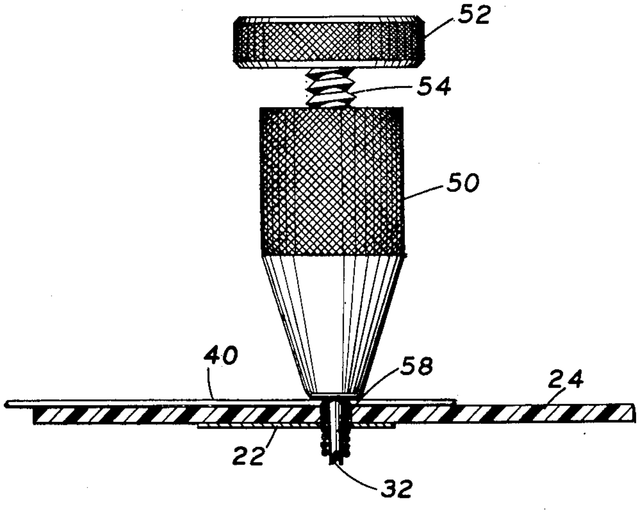

FIGURES 5 and 6 taken together, are elevations partly in section showing a novel hand tool used to perform the method of the instant invention.

Figure 1:
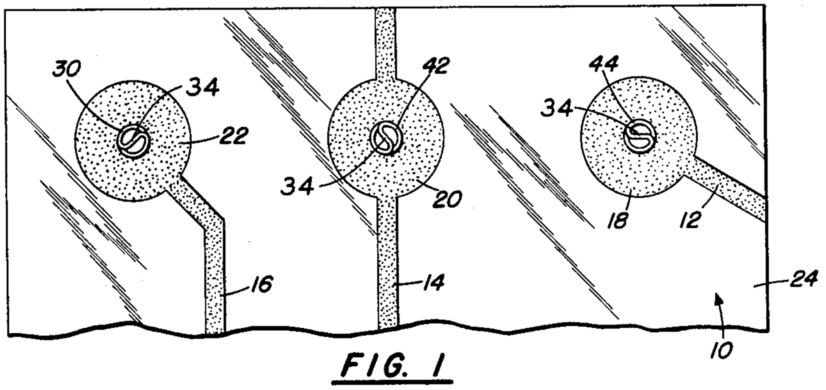
FIGURE 1 is a fragmentary top plan view of a printed circuit panel embodying the present invention.
Figure 2:
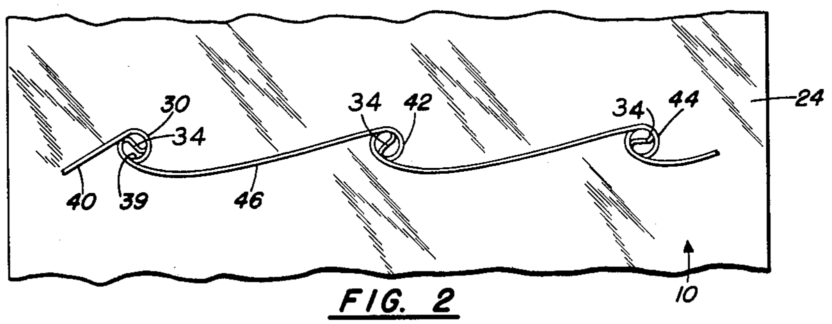
FIGURE 2 is a bottom view of the panel of FIGURE 1 and showing the opposite surface thereof.

Referring now to the drawings wherein like reference characters designate like or corresponding parts throughout, the assembly is shown generally by reference character 10 of FIGURES 1 and 2. A panel 24 which may consist of a sheet of electrically insulating material such as a phenolic plastic or other synthetic resinous material carries on one or both surfaces an array of conductive paths such as 12, 14 and 16. There are a number of well-known and accepted methods to produce these paths, among which may be mentioned providing a surface area completely covered by the conducting metal and etching chemically the unwanted portion; or removing the same by an abrading method. Another well-known and useful method comprises plating onto the insulating panel the desired metal configuration so to provide an array of conductive paths in a desired pattern. As will be readily appreciated, cross-connections between co-planar conductive paths lying spaced one from another on the panel with a third path extending between them cannot be made on the carrying surface but must be made on the opposing surface. For example in FIGURE 1 the illustrated conductive paths have respective enlarged portions 18, 20 and 22 for interconnection with other components or circuits. If it is desired to connect between paths 12 and 16, path 14 must be bridged, and the other side of the panel must necessarily be used for the connection.

An example of the method of interconnection between the three paths in accordance with this invention is now offered.

Figure 3:
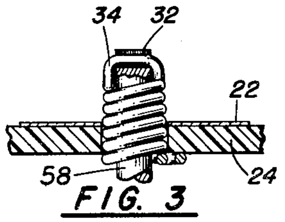
FIGURE 3 is an elevation partly in section showing the position of the conductive strand of the present invention during the assembly process.

Passages 30, 42, and 44 are formed through the insulating panel and piercing the conductive area substantially as shown; a length of wire 40 is placed on the insulating panel on the side opposite to the surface carrying the conductive paths in successive bridging relation to the several passages and a tool, which will presently be described, is used to grasp the wire at the bridging portion, apply thrust and twist the same into a helix substantially as seen in FIGURE 3 and thread it in edge-engaging relationship (FIGURE 4) with the passage whereby a part at least of the helix engages against the edge of the conductive path to extend beyond the panel. The wire extends between the successive terminals so formed as at 46 and interconnects the conductors. Of course, if it is desired to not interconnect path 14 to paths 12 and 16 while connecting paths 12 and 16 together, then no helix is formed at 42 but are formed only at 50 and 34.

Figure 4:
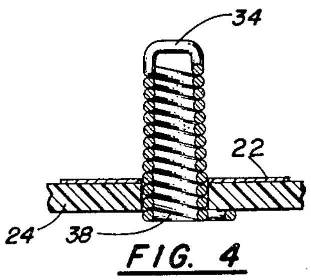
FIGURE 4 is an elevation partly in section showing a completed assembly of the novel disclosed terminal.

The resulting helical structure illustrated in FIGURE 4 is a flexible terminal or binding post with a hollow bore whose entrance, 38 is opened from the bottom surface of the panel. The terminal extends away from the conductive path and the longitudinal axis thereof forms a right angle with the plane of the panel. An electrical component may be readily connected to the terminal by soldering its lugs to the portion 34 which bridged the passage in the first method step, or merely by wrapping its lug or end wire around the terminal body and soldering the same.

It should be noted that the conductive wire strand when placed between passages and prior to twisting should be provided with a considerable slack so that when the helix is formed by the combined torque and thrust applied thereto the wire is not unduly tensioned. An amount of longitudinal slack commensurate with the desired convolutions of the helix must be provided.

The tool for winding the helix is shown in FIGURES 5 and 6 and consists of a body member and a driving spindle. The body 50 has a passage formed therethrough, which passage is threaded substantially as shown by reference character 56. The driving spindle consists of a driving element 52 shown here as a handle but which may represent any source of energy, an enlarged spindle portion 54 having threads formed thereon to cooperate with threads 56; and an end portion 58 of reduced diameter and tapering to terminate in a bifurcated end 32. When it is desired to form the helical terminal the tool is brought to the surface of the panel as shown in FIGURE 5 with the end of body 50 engaging same and bifurcated end 32 straddling the conductive wire strand 40. The body 50 is fixed to prevent its turning and driving element 52 is turned, thereby imparting torque and thrust to the grasped portion of the strand forcing it through the passage as shown in FIGURE 6 as the threaded members cooperated to advance the spindle through the body. It should be noted that the pitch of the threads 54 and 56 must be twice the diameter of the conductive wire strand 40 so that the end of the spindle 58 gathers and advances a double fold of the strand for each revolution. The tapering of spindle end 58 permits it to be readily withdrawn at the end of the forming cycle; this tapering configuration having the further advantage of increasing the edge contact force as the spindle advances down through the panel. An alternative method of withdrawing the spindle end from the completed helix consists of holding element 52 stationary and turning body 50 in the same direction as element 52 was turned in the winding step so that the threads therein cause spindle 58 to remove from the helix.

The tool is preferably operated by a motor and it is within the purview of the invention to provide an impact and limit switch circuit to turn the motor on and off automatically.

One of the chief advantages flowing from the techniques described above is that the interconnections are easily and cheaply made entirely from one side of the panel. If for example the other side of the panel is not available for work access then the accompanying method will interconnect paths without the necessity of their being engaged in any way except through the passages as described. It will also be apparent that the disclosed method will provide a circuit which does not in any wise depend on the printed technique. The conductive paths may be eliminated entirely and a circuit formed on an insulating panel as would be shown in FIGURE 2; then the interconnecting wires as at 46 perform functions of the conductive paths of the printed circuit boards.

I claim:

1. An article of manufacture comprising in combination an insulating sheet having parallel surfaces, a coating of metal bonded to a portion at least of one surface of said insulating sheet, a cavity formed to extend through said sheet and said coating, a flexible conductive strand arranged on the other surface of said insulating sheet, and a helix formed from a portion of said conductive strand and passing through said cavity to extend beyond the said coating.

2. An article of manufacture comprising in combination an insulating sheet having parallel surfaces, an array of conductive paths bonded to one surface of said insulating sheet, a cavity formed to extend through said sheet and one said path, a flexible conductive strand disposed on the other surface of said insulating sheet and entering said cavity, and a helix formed from a portion of said conductive strand comprising a series of convolutions passing through said cavity to extend beyond the said conductive path.

3. An article of manufacture comprising in combination an insulating sheet having parallel surfaces, an array of conductive paths bonded to each respective surface of said insulating sheet, at least one cavity formed to extend through said sheet at selected conductive paths, a flexible conductive strand disposed on one surface and entering said cavity, and a helix formed from a portion of said strand comprising a series of convolutions passing through said cavity to extend beyond the other surface, the longitudinal axis of said helix forming a right angle with the plane of said sheet.

4. An article of manufacture comprising in combination an insulating member having parallel surfaces, an area of metal bonded to one surface of said member, a passage formed to extend through said member and pierce said area, a conductive strand disposed on the other surface and entering said cavity, and a helix formed from a portion of said strand comprising a series of convolutions passing through said cavity in edge-engaging relation to extend beyond the said one surface, the longitudinal axis of said helix forming a right angle with the plane of said sheet.

5. An article of manufacture comprising in combination an insulating member having parallel surfaces, an array of conductive paths disposed on the respective surfaces, a plurality of passages formed in said member and piercing selected conductive paths, a conductive strand disposed on one member surface and intercommunicating between successive passages, and a helix formed from a portion of said strand comprising a series of convolutions threaded through each respective passage and extending beyond the other surface of said member.

References Cited in the file of this patent

UNITED STATES PATENTS

| | | |
|---|---|---|
| 1,946,889 | Wessel | Feb. 13, 1934 |
| 2,593,479 | Nieter | Apr. 22, 1952 |
| 2,902,629 | Little et al. | Sept. 1, 1959 |
| 2,923,859 | Worth et al. | Feb. 2, 1960 |